Patented Jan. 8, 1946

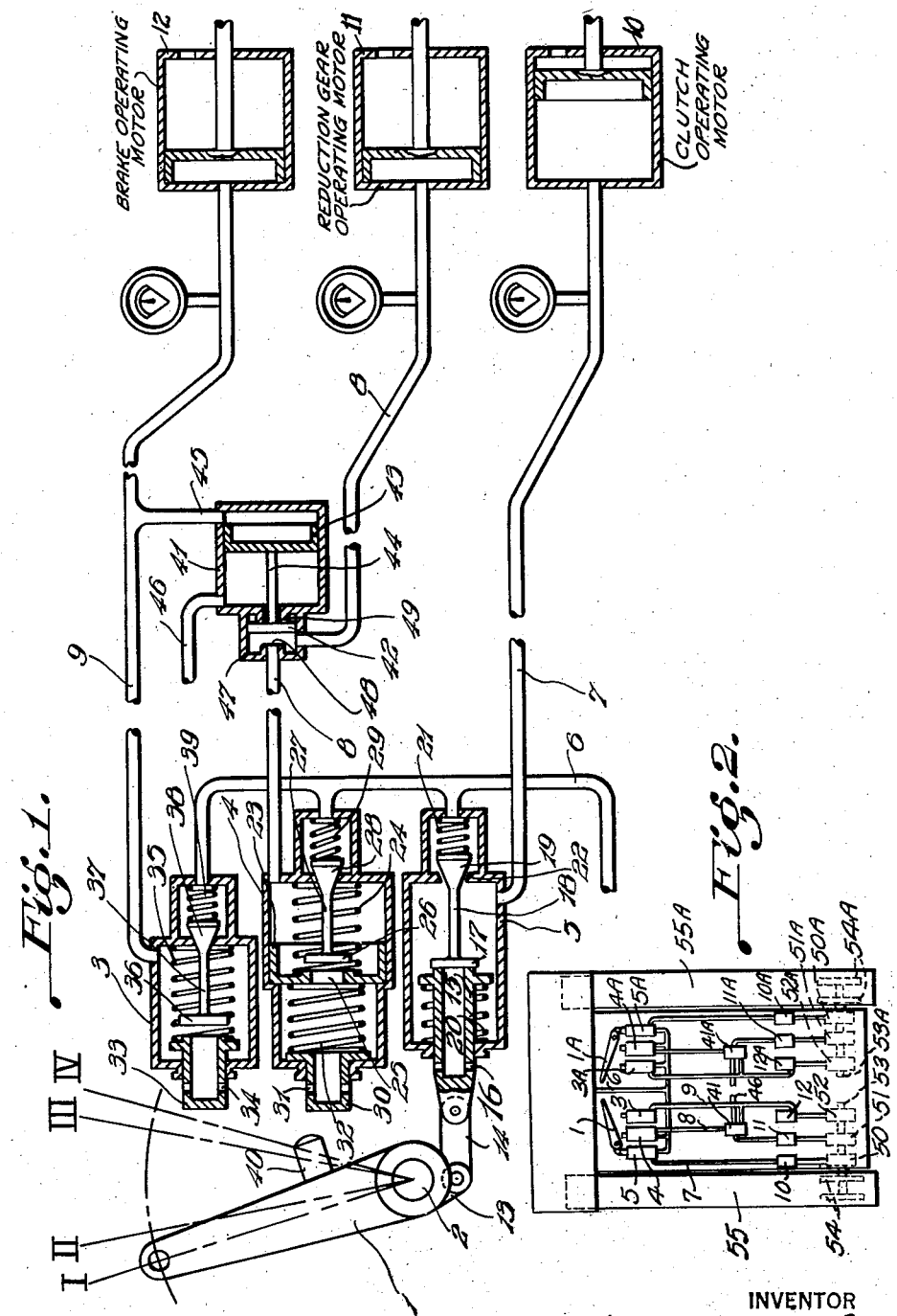

2,392,729

UNITED STATES PATENT OFFICE 2,392,729

SERVO ASSISTED MEANS FOR CONTROLLING THE MOVEMENT OF ROAD AND LIKE VEHICLES

Stanley Howard Edge, Lincoln, England

Application September 17, 1943, Serial No. 502,840
In Great Britain October 2, 1941

9 Claims. (Cl. 180—9.2)

This invention relates to differential fluid pressure operated systems for controlling the power driving means on road and like vehicles and has for its object to provide an improved and simplified arrangement which enables clutch, gear drive and braking mechanisms to be brought under a single servo assisted control for the purpose of speed control and of starting, stopping and steering the vehicle.

According to the invention a pneumatic or vacuum control system for vehicles is provided comprising a single operating element adapted to actuate a clutch, gear drive and brakes at one side of a vehicle, a number of valves adapted to be operated in succession directly by said operating element and vacuum or fluid pressure connections between said valves and servo cylinder to enable said cylinders to be operated in succession to disengage a clutch and render a gear drive operative and inoperative and finally to apply the brakes for stopping or steering the vehicle.

Reference will now be made to the accompanying drawing in which Fig. 1 illustrates diagrammatically clutch, gear and brake control devices constructed according to the invention, and Fig. 2 illustrates diagrammatically the application of the invention to an endless track vehicle.

The construction illustrated in Fig. 1 shows a single hand lever I for operating clutch, driving gear and brake mechanism, this hand lever being pivotally mounted at 2 and adapted to actuate, as hereinafter described, valve mechanisms arranged in housings 3, 4 and 5 which all communicate with a common conduit 6 connected to a source of compressed air supply while the valve housings are connected by conduits 7, 8 and 9 with servo cylinders 10 for operating clutch members, 11 for operating a gear drive, and 12 for operating the brakes.

The hand lever I has an extension 13 connected by a link 14 to a cylindrical sleeve 15 movably mounted in the housing 5, the said sleeve having air inlet ports 16 and a valve member 17 normally closing its inner end. The valve member 17 is carried by a stem 18 on the opposite end of which is mounted a compressed air inlet valve 19. A spring 20 surrounds the sleeve 15 whose end is forced thereby into contact with the valve 17, the spring pressure being transmitted through stem 18 to hold the valve 19 off its seat as shown. A spring 21 is disposed in the opposite end of the housing and tends to move the air valve 19 on to its seat 22.

The second valve housing 4 contains a piston 23 movable against a spring 24 and having a central aperture 25 adapted to be closed by a valve member 26, this valve member being carried by a stem 27 which also carries a valve member 28 movable against a spring 29. To operate the piston a secondary piston 30 is provided having air inlet ports 31 and movable against a spring 32 disposed between the two pistons.

The valve housing 3 has a piston sleeve 33 formed with air inlet ports 34 and movable against a spring 35 into engagement with a valve member 36 adapted to close the inner end of the piston sleeve. The valve member 36 is mounted on a stem 37 which carries a valve member 38 movable against a spring 39.

The piston 30 is adapted to be actuated by a stud 40 carried by the hand lever I and the piston 33 by the edge of the hand lever itself as hereinafter described.

Between the conduits 8 and 9 is connected a throw-over valve consisting of a housing 41 containing pistons 42 and 43 mounted on a rod 44. The housing has a branch 45 connecting it to the conduit 9 and a connection 46 leading to atmosphere. The two parts of the conduit 8 are connected to a cylinder 47 forming part of the housing 41 and which contains two seatings 48 and 49 between which the smaller piston 42 moves and acts as a valve member.

The application of the invention to an endless track vehicle is shown in Fig. 2 wherein the control devices of Fig. 1 are shown in outline and indicated by similar reference numerals. The servo cylinders 10, 11 and 12 controlled by valves 5, 4, 3 and 41 are shown connected respectively to clutch, gear drive and brake mechanisms 50, 51 and 52 each disposed around one of the driving shafts 53 carrying sprocket wheels 54 by which the endless track 55 at one side of the vehicle is driven. A duplicate set of servo cylinders 10A, 11A and 12A controlled by valves 5A, 4A, 3A and 41A and connected respectively to clutch, gear drive and brake mechanisms 50A, 51A and 52A on driving shaft 53A carrying sprocket wheels 54A is provided for the endless track 55A at the other side of the vehicle. By providing two entirely separate sets of apparatus with two hand levers I and IA, each track can be independently driven and controlled.

The operation of the arrangement above described is as follows:

The hand lever I has four main positions indicated in the drawing at I, II, III and IV, the positions of the parts shown being those corresponding to position I, in which the clutch control servo cylinder 10 is under full air pressure and the servo cylinders 11 and 12 are open to atmosphere. This is explained by the fact that in the position illustrated the valve 19 is off its seating so that compressed air entering housing 5 from conduit 6 can freely enter the conduit 7. In valve housings 3 and 4 the air valves 38 and 28 are seated and, therefore, no compressed air can enter these two housings. In these conditions, the interior of cylinder 11 communicates with atmosphere through conduit 8, cylinder 47, the second part of conduit 8, housing 4, opening 25 and air ports 31. Cylinder 12 communicates with atmosphere through conduit 9, housing 3 and air ports 34, valve 36 being off its seat.

When the hand lever is moved to position II, a pull towards the left is exerted on the link 14, sleeve 15 is moved against the action of its spring 20 and the air pressure combined with the tendency of spring 21 to expand moves valve 19 on to its seating. The supply of compressed air is thereby cut off from the housing 5 and conduit 7 and cylinder 10 are placed in communication with atmosphere through the interior of sleeve 15 and air ports 16. Pressure being removed from control cylinder 10, the clutch components become disengaged.

The next stage of movement of the hand lever towards position III brings the stud 40 into operative contact with piston 30, inward movement of which seats the valve 26 by moving piston 23 and unseats the valve 28 so that air under pressure is admitted to housing 4 and thence through conduit 8, and cylinder 47 to cylinder 11 to render the gear drive operative.

This gear drive consists of a speed reduction gear of any known type which will enable a drive at lower speed than normal to be transmitted to the road wheel or endless track after the normal drive has been disconnected by disengagement of the clutch. The purpose of this gear drive is to enable gradual turning movements to be made as otherwise the disconnection of the clutch and sudden application of the brakes at one side of the vehicle would produce a sharp turn and would only enable the vehicle to proceed by a series of jerks to right or left. The inclusion of the speed reduction gear ensures that the vehicle can proceed in a sinuous path, if necessary and gives the driver more complete control in steering.

As the hand lever 1 is moved to position IV it operates piston sleeve 33 in valve housing 3 to seat valve 36 and unseat valve 38 so that air pressure can pass through the housing 3 and conduit 9. It therefore acts on the piston 43 of larger area in the throw-over valve and moves the valve members including the small piston 42 towards the left, closing off the conduit 8 from pressure and opening that portion which leads to the cylinder 11 to atmosphere through conduit 46, the piston 42 having moved from seating 49 to seating 48. The speed reduction gear is thereby rendered inoperative. Full pressure is then exerted through conduit 9 to cylinder 12 to cause application of the brakes. Skid braking, that is full application of the brakes at one side of the vehicle is only used when a sharp right angled turn is required. For all normal turning and maneuvering the speed reduction gear is used.

When the hand lever 1 is moved in the reverse direction to that above described, the brake cylinder 12 is first opened to atmosphere owing to the release of piston sleeve 33, full pressure is restored and subsequently released to atmosphere in cylinder 11 and finally full pressure is restored and maintained in cylinder 10 to maintain the clutch members in contact until the position of the hand lever 1 is again adjusted.

The invention finds a useful application to the steering of endless track vehicles in which application the mechanism illustrated is duplicated and two hand levers are provided one to control the clutch, gear and brake mechanism at each side of the vehicle.

In such an application the arrangements above described enable the turning movements of the vehicle to be very simply controlled as the initial movement of either hand lever causes disengagement of a clutch and the subsequent movement to apply the speed reduction gear enables a retardation in speed at one side to be produced whereby a gradual turning movement of the vehicle to right or left results. Alternatively by a sudden movement of the hand lever to full pressure position (IV) an immediate right angle turn of the vehicle can be effected. Simultaneous operation of both hand levers will bring the vehicle to a standstill either gradually or suddenly according to the speed of operation of the hand levers.

The arrangement above described can be varied by utilising a vacuum producing means instead of a source of compressed air, the only adjustment necessary in the arrangements described being the reversal of the connections to the operating cylinders and the reaction valve or valves.

I claim:
1. A control system for vehicles having driving means at the respective sides thereof and a clutch, reduction gear and brake for each of said driving means, comprising three servo motors operative by differential fluid pressure to control the clutch, reduction gear and brake respectively for each driving means, a series of valves for controlling the servo motors for the clutch, reduction gear and brake, and a single operating element arranged to operate the series of valves to cause clutch disengaging operation of one of the servo motors, reduction gear engaging and disengaging operation of a second servo motor and to cause brake applying operation of a third servo motor for stopping or steering the vehicle.

2. A control system according to claim 1, wherein said series of valves and single operating element are so arranged that movement of said element in one direction operates said valves in succession to cause said clutch disengaging operation, reduction gear engaging and disengaging operation, and brake applying operation to take place in said order.

3. A control system according to claim 1, wherein said series of valves and single operating element are so arranged that movement of said element in one direction operates said valves in succession to cause said clutch disengaging operation, reduction gear engaging and disengaging operation, and brake applying operation to take place in said order, and return movement of said element reverses the respective operations which ensue when said element is moved in said one direction and causes said reverse operations to take place in reverse order from that of said first-mentioned order.

4. A control system according to claim 1, including a throw-over valve interposed between the servo motors controlling the reduction gear and the brake and their respective valves of said series for placing the brake controlling servo motor in full brake applying condition while the servo motors for the clutch and reduction gear are in condition for disengagement of the clutch and reduction gear.

5. A control system according to claim 1, wherein said operating element comprises a pivoted control lever, and said series of valves occupy such positions relatively to said control lever that the clutch controlling servo motor is fully actuated to clutch engaging position while said other servo motors are in reduction gear, disengaged and brake released conditions respectively, and wherein successive movements of said lever operate the valves of said series to place the clutch controlling servo motor in clutch disengaging condition, to place the reduction gear controlling servo motor in engaging and then in disengaging condition, and to place the servo motor for controlling the brake in brake applying condition.

6. A control system comprising a plurality of servo cylinders, pistons in the respective cylinders operative by differential fluid pressure for controlling a clutch, reduction gear and brake respectively, a series of controlling valves having controlling connections with the respective cylinders, a controlling member cooperative with the valves in succession to operate the clutch controlling valve, then the reduction gear controlling valve and finally the brake controlling valve, and a throw-over valve interposed in the connection between the reduction gear controlling cylinder and its controlling valve in said series and controlled by fluid pressure variation in the connection between the brake controlling cylinder and its control valve in said series for automatically placing the reduction gear controlling cylinder in gear disengaging condition when the brake controlling cylinder is placed in brake applying condition.

7. A control system according to claim 6, wherein said throw-over valve includes a cylinder having a piston therein subject to fluid pressure conditions in the connection between the brake controlling cylinder and its controlling valve for automatically operating the throw-over valve.

8. A control system according to claim 6, wherein said controlling member comprises a pivoted operating arm having a link connected thereto at one side of its pivot and to the controlling valve for the clutch controlling cylinder, said link being operative by the initial stage of movement of said arm in one direction to place the valve for the clutch controlling cylinder in clutch disengaging condition, and the portion of said arm at the opposite side of its pivot being operative, by continued movement of said arm in said direction, to place the valve for the reduction gear controlling cylinder in gear engaging condition, and to then place the valve for the brake controlling cylinder in brake applying condition.

9. A control system according to claim 6, wherein said valve for the brake controlling cylinder is a reaction valve through which said cylinder is operated under a progressive pressure.

STANLEY HOWARD EDGE.